Nov. 22, 1927.
J. F. O'CONNOR
1,650,379
FRICTION SHOCK ABSORBING MECHANISM
Original Filed March 12, 1923   2 Sheets-Sheet 2
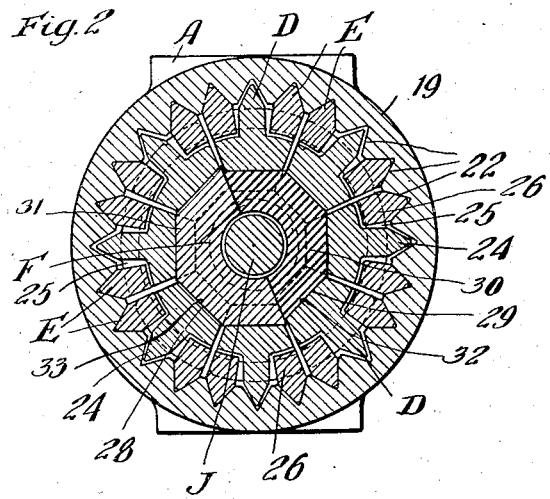
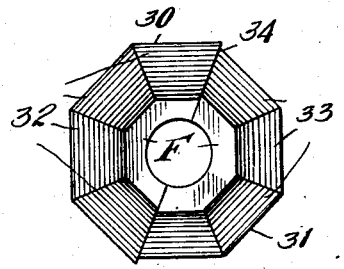
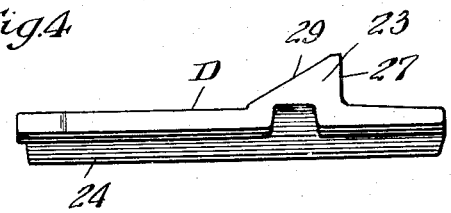
Witnesses
Wm. Geiger
Inventor
John F. O'Connor
By George J. Haight
His Atty.

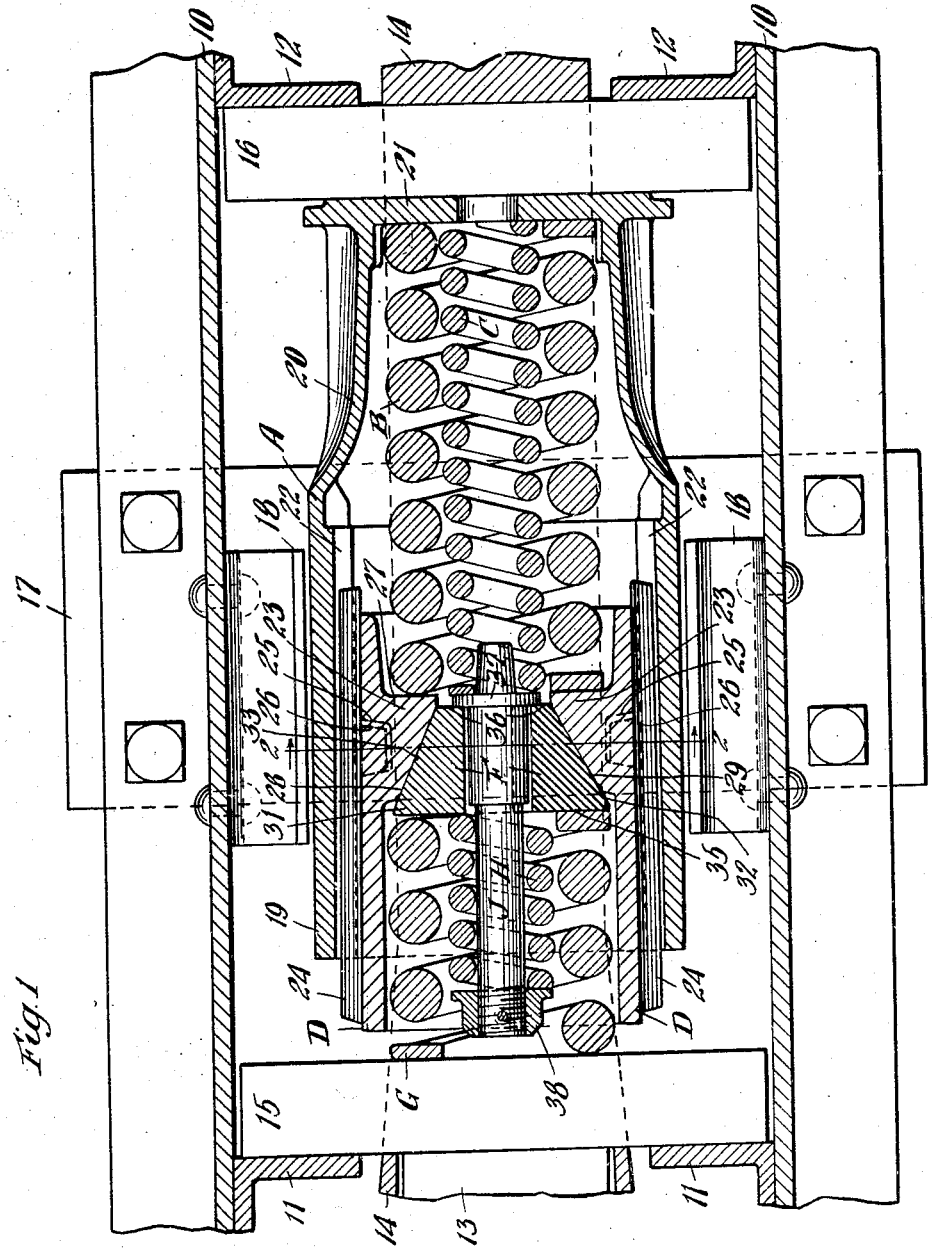

Patented Nov. 22, 1927.

1,650,379

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed March 12, 1923, Serial No. 624,313. Renewed May 21, 1927.

This invention relates to improvements in friction shock absorbing mechanisms.

One object of the invention is to provide a friction shock absorbing mechanism especially adapted for railway draft riggings, wherein are obtained high capacity and certain release.

More specifically, an object of the invention is to provide improvements on that type of friction draft gear commonly known as "Westinghouse," and by which improvements the use of the relatively expensive and comparatively fast wearing anti-friction pads, usually heretofore employed in said type of gear, is dispensed with.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith. Figure 2 is a vertical transverse sectional view of the shock absorbing mechanism proper corresponding to the line 2—2 of Figure 1. Figure 3 is an inner end elevation of the improved wedging means employed in my construction. And Figure 4 is a side elevational view of one of the combined friction-shoes and carriers employed in the gear.

In said drawings, 10—10 denote the usual channel draft sills of a car underframe, to the inner faces of which are secured front stop lugs 11 and rear stop lugs 12. A portion of a draw bar is indicated at 13, the same being operatively associated with a hooded cast yoke 14 within which is disposed said shock absorbing mechanism proper and also a front follower 15 and a rear follower 16. The yoke and parts therewith are supported in operative position by a detachable saddle plate 17. Inasmuch as the friction gear employs a cylinder of substantially cylindrical form, centering guide plates 18—18 are preferably employed on the inner sides of the draft sills 10.

The improved shock absorbing mechanism proper, as shown, comprises, broadly, a combined friction shell and spring cage casting A; a main release spring B; an auxiliary release spring C; a plurality of carriers D—D; a plurality of friction elements or splines E—E; a sectional wedge F; a main spring G; an auxiliary preliminary spring H: and a release pin J.

The casting A is of substantially cylindrical form throughout having the friction shell proper 19 formed at its front or outer end and the spring cage proper 20 at its rear or inner end. Said casting has an integral transverse wall 21 abutting the rear follower 16. On its interior, the friction shell section 19 is provided with a series of longitudinally extending, substantially V-shaped grooves 22—22 uniformly arranged around the interior of the shell. The surfaces defining said grooves 22 are preferably converged longitudinally inwardly of the shell so as to render the latter tapered.

The carriers, preferably eight in number, are of elongated form and each is provided, near its inner end, with an inwardly radially projecting lug 23. On its exterior, each of said elements D is provided with a centrally disposed, integral, radially outwardly projecting, strengthening rib 24 of wedge cross-section, as clearly illustrated in Figure 2. In addition, each of the elements D is recessed on its exterior face, as best indicated at 25 in Figure 1, to somewhat loosely accommodate correspondingly shaped lugs 26 provided on the splines E. The recesses and lugs 25 and 26 may be made with different amounts of lost motion therebetween so as to provide for a successive actuation of the splines E. Each spline E has an outer wedge-shaped edge fitting within and cooperable with a groove 22 of the shell. In actual practice, the front or outer ends of the elements D are normally spaced a predetermined distance from the front follower 15 so that said elements D will not be actuated until a predetermined preliminary spring action has occurred. When this amount of preliminary spring action has taken place, it is obvious that the elements D will be directly actuated by the force transmitted from the drawbar through the follower 15.

Each of the lugs 23 of the elements D is so formed as to provide a rearwardly facing transverse shoulder 27 against which bears the front end of the main spring B, the rear end of the latter bearing on the wall 21. In carrying out my invention, certain of the elements D are provided with keener wedge faces on the lugs 23 than others, and preferably four, or half of the total number of the elements D, will have a wedge face 28, as best shown in Figure 1, extending at an angle of approximately 22½° with respect to the axis of the mechanism. The remaining four elements D will have wedge faces 29 extending at a somewhat blunter angle with respect to the axis of the mechanism and preferably at an angle of approximately 30°.

The wedge means, designated broadly by the reference character F, preferably consists of two sections 30 and 31, parted on a diametrical plane passing through the axis of the mechanism, as best shown in Figure 3. The section 30 is provided with four wedge faces 32—32, extending at the same angle as and cooperating with the wedge faces 29 of the four corresponding carriers D. The other section 31 of the wedge means is provided with four wedge faces 33—33 extending at the same angle as and cooperable with the wedge faces 28 of the other four carriers D. By forming the wedge means in two sections, it is evident that the two sections are adapted to shift longitudinally relatively to each other on the parting faces indicated at 34, in Figure 3, for the purpose hereinafter described.

The sections 30 and 31 of the wedge means are provided with front flat transversely extending bearing faces 35 against which rests the inner end of the main preliminary spring G, the front end of the latter bearing against the front follower 15. Also, the wedge sections 30 and 31 are provided with flat transversely extending inner faces 36, against which bears a collar 37 formed on the release pin J, the two sections 30 and 31 being suitably recessed to loosely accommodate the thicker portion of the shank of the pin J, as best shown in Figure 1. Said release pin J, at its front end, carries a nut 38 between which and the front faces 35 of the wedge sections, is interposed the auxiliary preliminary spring H. The auxiliary release spring C bears at its forward end against the collar 37 and at its inner end against the wall 21. As clearly shown in Figure 1, the front end of the release pin J and nut carried thereby is normally spaced from the front follower 15, but at a lesser distance therefrom than the front ends of the carriers D.

The operation of the mechanism, assuming a buffing action, is as follows: As the draw bar and front follower 15 are moved to the right, as viewed in Figure 1, the initial action will be a compression of the main preliminary spring G, thus setting the wedge means taut with respect to the carriers D. As the follower 15 moves inwardly, it will next engage the outer end of the release pin J, moving the latter longitudinally inwardly of the shell, independent of the friction elements and the wedge means and setting up an additional preliminary action in the auxiliary preliminary spring H and also separating the collar 37 from the inner ends of the wedge sections. As the follower 15 continues its inward movement, it will next engage the outer ends of the carriers D, thereafter forcing the latter inwardly of the shell longitudinally at the same rate of movement as that of the follower 15. As will be evident, by the time the carriers D are set in motion, an effective wedging action will have been set up tending to force the friction elements radially outwardly of the shell and insuring the desirable frictional contact between the shell, on the one hand, and the splines, on the other hand. As the carriers D move inwardly of the shell, they will be compelled to gradually approach each other laterally, due to the taper of the shell, and this is accommodated primarily on the blunter angle faces 29 and 32, which, in turn, will induce a very slight relative longitudinal slippage between the wedge sections 30 and 31, the slippage being in a manner to allow the blunt angle wedge section 30 to recede slightly with respect to the wedge section 31. Obviously, this is accommodated by reason of the yielding resistance between the two wedge sections and the front follower 15.

Upon removal of the actuating force, the preliminary spring G is free to exert its action upon the follower 15 to disengage it from the ends of the elements D. Simultaneously, the two springs C and H exert their force upon the release pin J, imparting a rapid movement to the latter and causing a sudden blow against the inner ends of the wedge sections or the two sections in succession, if the same are appreciably shifted longitudinally during the compression stroke. This serves to collapse the wedge friction unit sufficiently to relieve the pressure between the friction elements and the shell, whereupon the main release spring B is operative to restore all of the parts back to their normal position.

With my improvement, I am enabled to dispense with the relatively expensive and comparatively soft antifriction pads heretofore commonly employed on the wedging means, without in any way militating against the certain release of the mechanism. Furthermore, by employing the different wedge angles heretofore described, the so-called keener angles of my improved mechanism may be made keener than those deemed possible heretofore with a consequent increase in the frictional capacity of the mechanism and without danger of bursting the shell, inasmuch as the blunter wedging faces 29 and 32 operate more or less in the manner of safety valves to compensate for the differential action arising by reason of the taper in the friction shell. As will be obvious, by eliminating the anti-friction pads, the initial cost of the apparatus is materially reduced and at the same time increased capacity is obtained without any attendant disadvantages, as heretofore described.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell; of a plurality of friction elements on the interior of and cooperable with said shell; a follower; a spring resistance for said elements; spreading means for applying lateral pressure to said friction elements, said means including wedge means and wedge elements interposed between said means and the friction elements, said means and wedge elements having co-operating sets of wedge faces, certain of said sets of faces being disposed at relatively blunt angles with reference to the longitudinal axis of the mechanism and the remaining sets being disposed at keen angles to said axis, each set of keen faces being transversely opposed to one of said blunt sets; and yielding means interposed between said wedge means and the follower.

2. In a friction shock absorbing mechanism, the combination with a friction shell having interior friction surfaces converged inwardly of the shell; of a plurality of friction elements on the interior of and co-operable with the friction surfaces of said shell; lateral pressure transmitting members co-operating with said elements, each of said members having an inner wedge face, the faces of some of said members being inclined at a more acute angle than the faces of the others with respect to the line of applied force, said elements being adapted to receive the actuating pressure; a follower; a spring resistance for said elements; a wedge means having a plurality of wedge faces co-operating respectively with the wedge faces of said pressure transmitting members, and similarly inclined thereto; and spring means co-operable with said wedge means.

3. In a friction shock absorbing mechanism, the combination with a friction shell; of a plurality of friction elements on the interior of and cooperable with said shell; lateral pressure transmitting members cooperating with said elements, said members being adapted to receive the actuating pressure and provided on their inner sides with wedge faces, certain of said wedge faces extending at a keener angle with respect to the axis of the mechanism than others; a follower adapted to engage the outer ends of said members, a spring resistance for said members; a sectional wedge having correspondingly differently inclined wedge faces cooperable with the wedge faces of said members; and spring means interposed between said follower and said sectional wedge.

4. In a friction shock absorbing mechanism, the combination with a friction shell having interior friction surfaces converged inwardly of the shell; of a plurality of friction elements on the interior of and cooperable with said friction surfaces of the shell; wedge shoes cooperating with said elements, said shoes being adapted to receive the actuating pressure and provided on their inner sides with wedge faces, certain of said faces extending at a keener angle than others with respect to the line of applied force; a follower adapted to engage the outer ends of said shoes; a sectional wedge having correspondingly inclined wedge faces cooperable with said differently inclined wedge faces of said shoes; and spring means interposed between said follower and the sectional wedge.

5. In a friction shock absorbing mechanism, the combination with a shell having interior friction surfaces; of a plurality of carrier elements within said shell, said elements being arranged to receive the actuating pressure having inner wedge faces, certain of said faces extending at a more acute angle than others, relative to the line of applied force; friction members interposed between said carrier elements and the friction surfaces of the shell; a follower; a spring resistance for said elements; and a two-part wedge co-operable with said wedge faces of the carrier, one part having a wedge face extending at a keener angle than a wedge-face on the other part relative to the line of applied force and cooperable with the respective friction elements, the parts of said wedge being shiftable relative to each other; and spring means interposed between said follower and wedge.

6. In a friction shock absorbing mechanism, the combination with a friction shell having a plurality of longitudinally extending grooves on the interior thereof; of a follower; a plurality of carriers within the shell and each provided with a wedge face on its inner side; a plurality of splines mounted on said carriers and cooperable with some of said grooves of the shell; a main release spring cooperable with said carriers; wedge means having wedge faces extending at different angles with respect to the axis of the mechanism; an auxiliary release spring cooperable with said wedge means; a release pin cooperable with said wedge means; a main preliminary spring interposed between said follower and the wedge means; and a second preliminary spring operatively interposed between said pin and the wedge means.

7. In a friction shock absorbing mechanism, the combination with a friction shell having a plurality of longitudinally extending grooves on the interior thereof; of a follower; a plurality of carriers within the shell and each provided with a wedge face on its inner side; a plurality of splines mounted on said carriers and cooperable with some of said grooves of the shell; a main release spring cooperable with said carriers; wedge means having wedge faces extending at different angles with respect to the axis of the mechanism; an auxiliary release spring cooperable with said wedge means; a release pin cooperable with said wedge means; a main preliminary spring interposed between said follower and the wedge means; and a second preliminary spring operatively interposed between said pin and the wedge means, said wedge means comprising independent sections.

8. In a friction shock absorbing mechanism, the combination with a shell having interior, inwardly converging friction surfaces; of a plurality of friction elements cooperating with the friction surfaces of the shell; spring means resisting movement of said elements; and combined wedge pressure and spreading means cooperating with said elements, said means including a two-part wedge block, each part of said block having a plurality of wedge faces, the faces of one of said parts being disposed at relatively keen wedge acting angles with reference to the longitudinal axis of the mechanism and the faces of the other part being disposed at relatively blunt angles to said axis, and the wedge faces of one of said parts being transversely opposed to the faces of the other part.

In witness that I claim the foregoing I have hereunto subscribed my name this 9th day of March 1923.

JOHN F. O'CONNOR.